Figure 1:
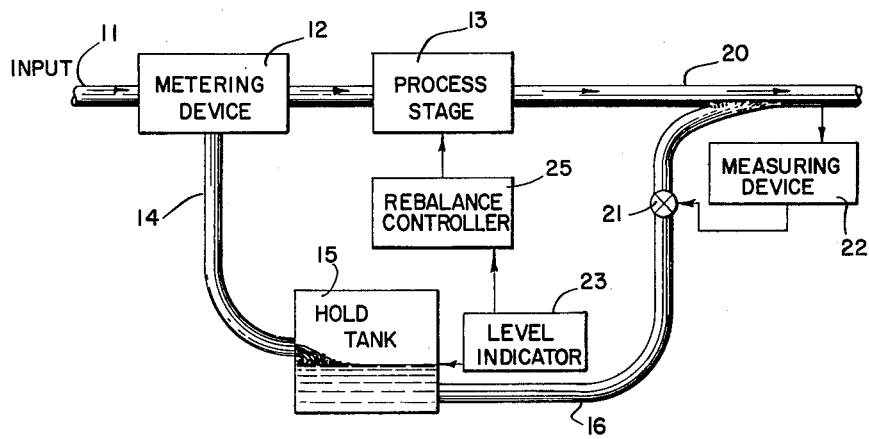

April 17, 1962     A. R. GLUECK     3,029,829

PROCESS CONTROL

Filed Nov. 18, 1960

INVENTOR.
ALAN R. GLUECK

BY

ATTORNEYS

3,029,829
PROCESS CONTROL
Alan R. Glueck, Boston, Mass.
(3030 Van Aken Blvd., Shaker Heights 20, Ohio)
Filed Nov. 18, 1960, Ser. No. 70,319
6 Claims. (Cl. 137—3)

This invention relates in general to process control and more particularly to a system for providing rapid response control in fluid stream processes.

The increasing demand in industrial processing for automatic control techniques has resulted in the development of a great diversity of process control systems. While particular systems have been developed to suit the needs of the particular process employed, in general, process control utilizes some sort of feedback in order to maintain critical variables in the process output within close tolerance limits of a predetermined standard or profile. Thus, a transducer on the output side of the process is employed to develop a signal which is characteristic of variations in the critical variables and this developed signal is compared to a signal representing the desired "standard" profile. Any discrepancy between the observed and standard signals is provided as a correction signal to the processing apparatus itself in order to alter the process in a direction tending to overcome the measured discrepancy.

Nowhere has the advent of automatic process controls been more significant than in the chemical processing industries, in which either continuous streams or "batches" of material are chemically processed into an output product. Improving the automatic process controls in the chemical industry can lead not only to efficient production of existing products within close tolerance limits, but also can enable reactions to be carried out which heretofore have been impossible in a production facility because the conditions necessary could not be maintained.

Process control systems are available which are capable of regulating pressure, temperature, concentration, and other similar variables; however, in many cases precise control has not been attained in systems where changes in the processing element itself are necessarily slow. For example, where large quantities of fluid are being processed to provide an output fluid at a relatively high temperature, the temperature of the output fluid may vary due to variations in heat transfer coefficient, quality of the heating medium itself, corrosion, or other changes in the heating elements. The time required, however, to correct for such variation may be several minutes, and during this period the temperature of the output fluid will vary somewhat from the precise values required to meet the standards of the particular process.

It is, therefore, a primary object of the present invention to provide a control system for fluid processes which will provide vitrually instantaneous control.

It is another object of the present invention to provide a double feedback control system in which the primary control of a critical variable is provided virtually instantaneously and a rebalancing control is provided with a slower response time period.

It is still another object of the present invention to provide a process control system which is particularly adapted to controlling a fluid process wherein the desired value of the current fluid may be obtained by averaging two separate values of the input fluid.

Broadly speaking, the process control system of the present invention provides an instantaneous control loop and a somewhat slower rebalancing control loop. A bypass stream is split off from the main stream previous to the operation of the processing element to bypass a portion of the fluid around the processing element and remix it at the output of the processing element. The major portion of the stream is sent into the processing element where it is slightly "overprocessed," that is, for example, in the case of temperature, it is overheated beyond the desired output temperature. The mixing ratio at the output of the processing element between the processed stream and the bypass stream is then controlled by a transducer in the output stream. If the "overprocessing" is sufficient to provide for any expected variation in processing, then by controlling the mixing ratio the temperature of the output may be maintained constant. Since this control involves transferring temperature information both from the output and from a standard "profile" to the valve regulating this output mixing ratio, the response time is limited to the response time of the valve which may be made very short. An element is inserted in the bypass line providing an output indication of the amount of bypass fluid being required to maintain the desired output temperature. The amount of fluid required, hence the value of this output signal, is related to the amount of "overprocessing" introduced in the processing step. When this output signal exceeds some predetermined limit indicative of a significant change in the effect of the processing, a correction signal is developed which is applied to the processing element itself to alter the processing in a direction to correct for this deviation. This latter correction is then a rebalancing correction, and the response time is limited to the response of the processing element. Hence, the overall effect is of a high-speed instantaneous control loop and a somewhat slower rebalancing loop, thereby providing both instantaneous control of the output product and long-term stability.

Figure 2:
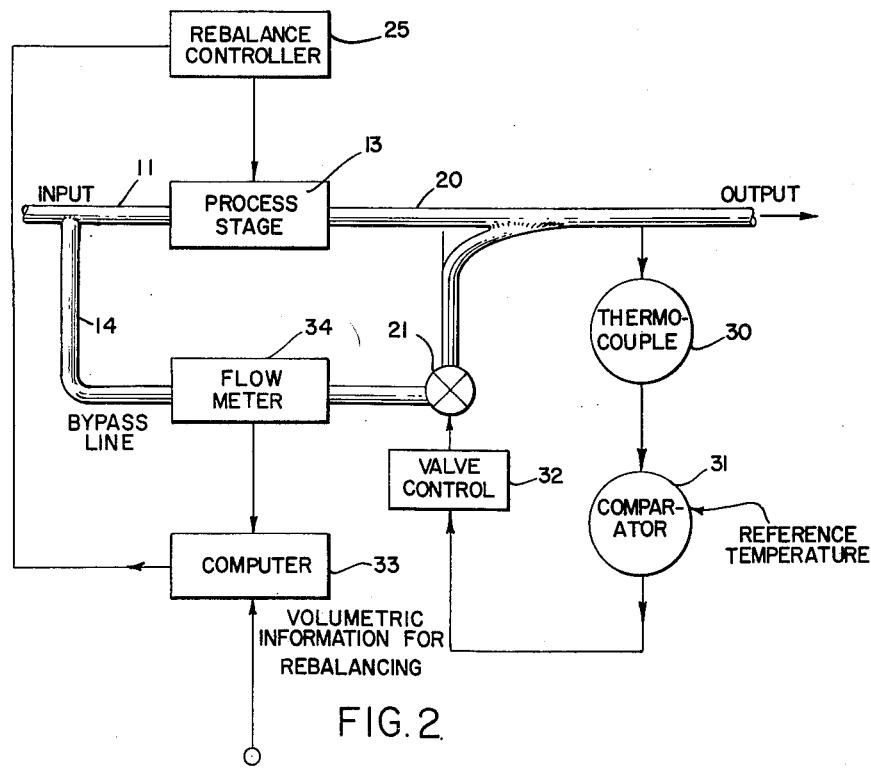

Other objects and advantages will become apparent from the following detailed description when taken in conjunction with the accompanying drawing in which:

FIG. 1 is an illustration in block diagrammatic form of a process control system in accordance with the principles of this invention; and FIG. 2 is an illustration in block diagrammatic form of a second embodiment of a process control system in accordance with the principles of this invention.

The unprocessed material stream is shown flowing through an output conduit 11 which passes through a metering device 12, and thence to the input of process stage 13. The meter 12 is adapted to provide output information of the mass flow of material through it. The process stage 13 is the point at which a physical change is effected in the material stream, for example, elevating the temperature. At the metering device 12, a portion of the input material stream is split off into bypass line 14 which in turn connects to the input of hold tank 15. Hold tank 15 serves as a reservoir having an input from the bypass line 14 and providing an output line 16 which connects through valve 21 into an output stream 20 from the process stage 13. The amount or portion of material diverted from the input stream into the bypass line is controlled by metering device 12 and the amount of material reinjected after the process stage into the material stream at 20 is controlled by the action of valve 21. Valve 21 is automatically operated in response to signals from measuring device 22 which is placed beyond the junction of the bypass line and the main stream output from the process stage 20 and is adapted to provide signals in response to variations of the critical characteristic of the process in the material stream.

The above-described process system operates as follows. The material in the main stream 11 is split into two segments at metering device 12. The main segment is flowed into the process stage where the processing operation is carried out. As previously indicated, the material is somewhat overprocessed in the process stage, that is, it is processed beyond the value of the critical characteristic which it is desired to have as an output value of the entire process system. The material bypassed through line 14 is reinjected into the output stream and used to blend with the slightly overprocessed material unitl a value of the critical characteristic, which meets the output requirement, is attained. The information as to the value of the output characteristic is provided through measuring device 22, and this device operates control valve 21, thereby providing a response limited only by the time response of the valve to variations in the critical characteristic of the material coming from the process stage 13. The hold tank 15 is initially partially filled with the material fluid at some convenient medial level, and the amount of material bypassed by metering device 12 is arranged to be just that amount required at the normal overprocessing setting of process stage 13 to achieve the desired output critical value when blended with the material directly from the process stage. If now a change occurs in the processing stage such that more of the bypassed material is required to maintain the desired output characteristic, then the level of fluid in the hold tank drops, and this drop is detected by level indicator 23 which provides an output signal to the rebalance controller unit 35, and this latter unit in turn controls the process in the process stage in a direction to correct for the change.

The described system is not limited to providing a constant value of the critical output characteristic, but rather, by utilizing a comparator in conjunction with the measuring device 22, the output characteristic may be made to follow a predetermined profile of this characteristic. The volume of the hold tank 15 should be made sufficiently large to maintain the output characteristic at its proper value for a time sufficient for the process to have responded to the commands of the rebalance controller. The overall system then employs two feedback loops. One feedback loop, the instantaneous loop, is formed by the measuring device 22 determining the characteristic and in turn controlling the operation of valve 21 to provide fast time response corrections to variations in the critical characteristic. The second feedback loop, which is the rebalancing loop, is formed by the level indicator 23 which indicates too high or too low a demand on the bypass line fluid and uses this indication to control the processing stage to increase or decrease the amount of processing. This change in the processing results in a return to the normal demand of the bypass fluids. The operation of this second rebalancing feedback loop is limited in time response by the dynamics of the processing stage, and in many instances, this will be relatively slow. As previously discussed, a typical application would be in the heating of fluids to a predetermined output temperature where the processing stage is essentially a heating stage. Another application would be in a pressurizing system where the process stage is now a compressor. Still other applications may be found in terms of viscosity or density controls of solutions and also in controlling the concentrations of ingredients added to solutions.

With reference now to FIG. 2, a second embodiment of an apparatus in accordance with the invention is illustrated in which like numbers refer to like parts of FIG. 1. The input stream 11 is again split into two portions with the major portion being supplied to process stage 13 and a portion split off into bypass line 14.

Fluid from the bypass line is again reinjected through valve 21 into the output stream 20. In this embodiment, the process stage is shown as a heating stage and the critical output characteristic is, therefore, the temperature of the output material. There is no hold tank in the embodiment illustrated in FIG. 2, but rather, a flow meter 34 adapted to provide an output indication of the velocity of flow of the material through the bypass line is utilized to provide the stabilizing feedback signal. After the mixing point of the bypass fluid and the processed fluid from the processing stage 13, a thermocouple 30 is coupled to the fluid stream to provide an indication of the output temperature. The output signal from thermocouple 30 is provided to a comparator unit 31 which also receives a signal indicative of a reference temperature. The function of the comparator unit is to generate an output signal indicative of any variation between the thermocouple 30 signal and the reference temperature, and this generated output signal is made to be indicative of the direction of any such variation. The reference temperature may be a constant value or may be a preselected profile of temperature. The output signal from the comparator is coupled directly to valve control 32 which may be an electromagnetic or other means of controlling the valve 21, thereby controlling the amount of unprocessed bypass material supplied to the output stream. If there is an increased demand felt in the bypass line, due to a steady drift in the output temperature away from the predetermined value, this results in a change of the velocity through flow meter 34 and hence a change in the signal output provided from the flow meter to computer unit 33. Computer unit 33 is also provided directly with volumetric information and by this means provision can be made for variations in the output volume, due, for example, to variations in the input volume of material, thereby providing that increased velocity due to an increased total flow of material without the undesired change in output temperature will not in fact be coupled through the computer unit into the rebalance controller 25. In this embodiment, the control system again consists essentially of two loops, the instantaneous loop including the thermocouple and control valve 21 and the rebalancing stabilizing loop including the flow meter and computer and rebalance controller.

The control system described above has been described in terms of a continuous process stream; however, the same principles will apply when the process is being carried out not on a continuous stream of input materials but on discrete batches of material, by diverting a specific portion, or an absolute amount, of each batch of material through the bypass line. While specific examples such as temperature, viscosity, density, and the like, have been enumerated, this control system is applicable to any process wherein the value of the critical characteristics may be varied by blending of unprocessed material with the processed material. In view of the fact, therefore, that numerous modifications and departures may now be made by those skilled in this art, the invention described herein is to be construed as limited only by the spirit and scope of the appended claims.

What is claimed is:

1. Apparatus for controlling the processing of a fluid stream comprising, a processing element adapted to effect a change in the physical characteristic of said material stream; a detector element disposed downstream of said processing element and adapted to provide an output signal varying in accordance with the variations in said physical characteristics; bypass means adapted to divert a portion of said material stream around said processing element to rejoin said material stream at a point between said processing element and said detector element; valve means responsive to variations in output signal from said detector element adapted to control the amount of said fluid flowing from said bypass means into said material stream at said point between said processing element and said detector element; means adapted to determine a rate at which said fluid is drawn from said bypass means through said valve and to provide a signal to said processing element when said rate exceeds a predetermined value, said signal to said processing element being adapted to effect said processing element in a manner to return said withdrawal rate to said predetermined value.

2. Apparatus for controlling the processing of a fluid stream comprising, a processing element adapted to effect changes in a physical characteristic of said fluid stream; detector means disposed at a point downstream from said processing element and adapted to provide an output signal indicative of variations in said physical characteristic of said fluid stream in the area adjacent to said detector element; bypass means adapted to divert a predetermined portion of said fluid stream around said processing element and to reinsert said predetermined portion into said fluid stream at a point between said detector element and said processing element; valve means included within said bypass means and adapted to control the amount of fluid withdrawn from said bypass means and inserted into said fluid stream, said valve means being adapted to respond to output signals from said detector means in the manner to maintain said physical characteristic of said fluid stream within predetermined limits, a reservoir element included within said bypass means, said reservoir element having a predetermined ambient quantity of said fluid within it, said fluid in said reservoir being available for insertion through said valve into said fluid stream when said predetermined portion of said fluid diverted through said bypass means is insufficient to maintain said physical characteristic within said predetermined limits, sensor means adapted to provide an output signal when said ambient quantity in said reservoir exceeds predetermined limits, said output signal from said sensor means being adapted to effect said processing element in a manner to maintain said physical characteristic of said fluid stream within said predetermined limits while maintaining the ambient quantity of said fluid within said reservoir means at said predetermined ambient quantity.

3. Apparatus for controlling processing of a fluid stream comprising, a processing element adapted to effect changes in a physical characteristic in said fluid stream, said processing element being adapted to change said physical characteristic to a value exceeding predetermined limits of said characteristic, detector means disposed downstream of said processing element and adapted to provide an output signal indicative of variations in said physical characteristic of said fluid stream in the region adjacent to said detector means; bypass means adapted to divert a portion of said fluid stream around said processing element and to reinsert said portion of said fluid stream into said fluid stream at a point between said detector element and said processing element; valve means adapted to control the amount of fluid flowed from said bypass means into said fluid stream, said valve means being controlled by said output signals from said detector means in a manner to maintain said physical characteristic of said fluid stream within said predetermined limits; indicator means associated with said bypass means and adapted to provide an output signal indicative of the portion of said fluid stream flowing through said bypass means, said output signal from said indicator means being coupled to said processing element in a manner to control said processing element.

4. Apparatus for controlling processing of a fluid stream comprising, a processing element adapted to effect changes in physical characteristics of said fluid stream, detector means disposed downstream from said processing element and adapted to provide an output signal indicative of variations of said physical characteristic in said fluid stream in the region adjacent to said connector means, a reference signal generator adapted to provide output signals related to predetermined values of said physical characteristic, comparative means coupled to said detector means and said reference means and adapted to provide an output signal related to the difference between said detector signal and said reference signal; bypass means adapted to divert a portion of said fluid stream around said processing element and to reinsert said diverted portion into said fluid stream at a point between said detector element and said processing element; valve means adapted to control the portion of said diverted fluid flowing from said bypass means into said fluid stream, said valve means being adapted to respond to signals from said comparator means in the manner to maintain said physical characteristic in the region adjacent to said detector means within predetermined limits; sensor means associated with said bypass means and adapted to provide an output signal indicative of the flow rate of said fluid through said bypass means, the output of said sensor means being coupled to said processing element in a manner adapted to maintain a substantially constant flow through said bypass means and maintain said physical characteristic in the region adjacent to said detector within said predetermined limits.

5. The method of controlling the processing of a fluid stream which includes the steps of overprocessing a portion of said fluid stream, blending an unprocessed portion of said fluid stream with said overprocessed portion in a manner to maintain a physical characteristic of said stream within predetermined limits, deriving a signal indicative of the portion of said unprocessed material required to be blended with said processed material to attain said predetermined characteristic and utilizing this said signal to control said processing in a manner to maintain said blending portion at a substantially constant value.

6. Apparatus for controlling the processing of a fluid stream comprising, a processing element adapted to effect changes in a physical characteristic of said fluid stream; detector means disposed at a point downstream from said processing element and adapted to provide an output signal indicative of variations in said physical characteristic of said fluid stream in the area adjacent to said detector element; a reservoir element having an inlet and an outlet; bypass means adapted to divert a predetermined portion of said fluid stream into said reservoir inlet; valve means connecting said reservoir outlet to said fluid stream at a point between said processing element and said detector element, said valve means being adapted to control the amount of fluid withdrawn from said reservoir and inserted into said fluid stream, said valve means being adapted to respond to output signals from said detector means in a manner to maintain said physical characteristic of said fluid stream within predetermined limits, said reservoir being adapted to maintain an ambient quantity of said fluid within it; sensor means adapted to provide an output signal when said ambient quantity in said reservoir exceeds predetermined quantity limits, said output signal from said sensor means being adapted to effect said processing element in a manner to maintain said physical characteristic of said fluid stream within said predetermined limits while maintaining the ambient quantity of said fluid within said reservoir means within said predetermined quantity limits.

No references cited.